United States Patent

Ikenberry et al.

[11] Patent Number: 5,213,445
[45] Date of Patent: May 25, 1993

[54] SYSTEM FOR HEATED AIR EXTRACTION OF CONTAMINANTS FROM SOIL STACK

[76] Inventors: Maynard D. Ikenberry; Dwight S. Ikenberry, both of 5523 Peninsula Dr. SE., Olympia, Wash. 98503

[21] Appl. No.: 766,044

[22] Filed: Sep. 26, 1991

[51] Int. Cl.$^5$ .............................................. B09B 3/00
[52] U.S. Cl. .................................. 405/128; 405/131; 405/258
[58] Field of Search .............. 405/128, 129, 131, 258, 405/263

[56] References Cited

U.S. PATENT DOCUMENTS

| | | | |
|---|---|---|---|
| 4,839,061 | 6/1989 | Manchak et al. | 405/128 X |
| 4,842,448 | 6/1989 | Koerner et al. | 405/258 |
| 4,849,360 | 7/1989 | Norris et al. | 435/264 |
| 4,895,085 | 1/1990 | Chips | 405/128 X |
| 4,919,570 | 4/1990 | Payne | 405/128 |
| 4,973,811 | 11/1990 | Bass | 219/10.57 |
| 4,982,788 | 1/1991 | Donnelly | 405/131 |
| 5,011,329 | 4/1991 | Nelson et al. | 405/128 |
| 5,018,576 | 5/1991 | Udell et al. | 405/131 X |
| 5,035,537 | 7/1991 | Rose | 405/128 |
| 5,067,852 | 11/1991 | Plunkett | 405/128 |

*Primary Examiner*—David H. Corbin

[57] ABSTRACT

The recirculating system includes a soil stack (10), which is formed by sequential layers of contaminated soil from a site and hot air pipes (22, 26, 32, 34). A plurality of vapor collection pipes (40, 46) is laid over the top of the stack, with a sealing member (50) positioned over the entire soil stack (10) and sealed around the base thereof. First and second connecting means (99, 102) connect the hot air pipes and the vapor collection pipes to a heating/vapor destruction system (52), which includes a burn chamber (54), a first air duct (91) extending from the outlet of the burn chamber (54) to a first blower (93), a second air duct (97) extending from the first blower (93) to the first connecting means (99), a third air duct extending from the second connecting means (102) to a second blower (110), and a fourth air duct which extends from the second blower (110) to the inlet (58) of the burn chamber (54). Test ports (114, 115) are positioned in the second connecting means to continuously determine the level of contaminants in the vapor extracted from the soil stack (10).

22 Claims, 3 Drawing Sheets

SYSTEM FOR HEATED AIR EXTRACTION OF CONTAMINANTS FROM SOIL STACK

TECHNICAL FIELD

This invention generally concerns the art of remediation of contaminated soil and more particularly concerns a system for on-site soil remediation using heated air.

BACKGROUND OF THE INVENTION

Over the past several years, there has been increasing environmental concern over soil contamination. There are various well-known sources of contamination, including underground petroleum storage tanks used by gasoline service stations and the like. As a result of this increasing environmental concern, government regulations have come into force which place strict controls over such underground storage tanks and which will, over a period of years, eventually require replacement of a significant percentage of existing tanks. As part of the process of removing and replacing such underground storage tanks, a significant amount of the surrounding soil, typically in the range of 100-1000 cubic yards, must be removed and then treated to remove any contaminants which may have leaked from the tanks. Treatment of the soil, generally referred to as remediation, can be accomplished in several ways, including removing and disposing of the soil, or treatment of the soil on site. Disposal of contaminated soil is typically quite expensive and requires new soil to replace the soil which has been removed. In addition, such soil still is contaminated, and thus, the basic contamination problem is only moved to another, albeit typically more remote, location.

Many different systems are used for on-site soil treatment. Typically, many of these systems involve drilling a plurality of extended wells on the site, forcing the vaporization of the contaminants in some manner and then permitting the vaporous contaminants to escape through the wells. Two such systems are shown in U.S. Pat. No. 4,842,448 to Koerner and U.S. Pat. No. 4,982,788 to Donnelly. However, such methods are also quite expensive, often ineffective, and take an exceptionally long time to complete, typically on the order of 6 to 18 months. Also, many of these systems release the vaporous contaminants to the atmosphere, a practice which is also now becoming increasingly unsatisfactory, and in many areas is not even permitted, due to air quality restrictions. When the contaminants produced by on-site treatment systems are not released to the atmosphere, they are typically treated by a completely separate system, which adds to the expense and complexity of the overall process. In another on-site treatment approach, shown in U.S. Pat. No. 4,919,570 to Payne, the soil is removed and treated in a plurality of treatment vessels. While such a system can be effective, it is inherently limited to rather small volumes of soil, and again is typically expensive and somewhat complex to operate.

Thus, in view of the increasing emphasis on soil remediation relative to underground storage tank facilities, a significant need has developed for a system for efficiently and inexpensively removing contaminants from soil surrounding storage tanks.

DISCLOSURE OF THE INVENTION

A system for on-site remediation of contaminated soil, comprising: a soil stack formed of alternating layers of contaminated soil and hot air pipes with a plurality of vapor pipes overlaying at least a portion of the soil stack, wherein the soil stack is covered by a sealing member to prevent escape of vapors from the soil stack to the atmosphere; and a recirculating system for heating air and destroying contaminants released from the soil stack, the system including a burn chamber, a hot air outlet and a vapor inlet, first means connecting the hot air outlet to said hot air pipes and second means connecting the vapor pipes to the vapor inlet, means moving heated air into the first connecting means and means moving contaminated vapors into the second connecting means and from there to the burn chamber.

BEST MODE FOR CARRYING OUT THE INVENTION

Very simply, the system of the present invention initially includes the formation of a soil stack at the site of the contaminated soil, e.g. where underground petroleum storage tanks have been removed. The contaminated soil is removed from its location to an adjacent location at ground level. The soil stack comprises alternating layers of contaminated soil and hot air pipe networks or grids. Over the top of the completed soil stack is positioned a grid or network of vapor pipes, with a sealing layer of air-impermeable material covering the entire soil stack. Connecting members extend through the sealing layer from the hot air pipes and the vapor pipes.

The system further includes a burner apparatus which heats air to a selected temperature, the heated air then being moved into the hot air pipes in the soil stack. The hot air circulating through the soil stack releases the contaminants in the soil in the form of vapor. The vapor is collected by the vapor pipes and moved out of the soil stack and into the burner, where the contaminants are destroyed to an acceptably safe level. The entire system is essentially closed so that only a small amount of contaminants is occasionally vented to the atmosphere. In some instances, such as when required by local air pollution control authorities, the small amount of contaminants which are exhausted are directed through a high temperature catalytic reactor to destroy those contaminants. When the contaminants in the soil stack have been sufficiently reduced, the soil stack is dismantled, and the remediated soil is then placed back in its original location.

Figure 1:
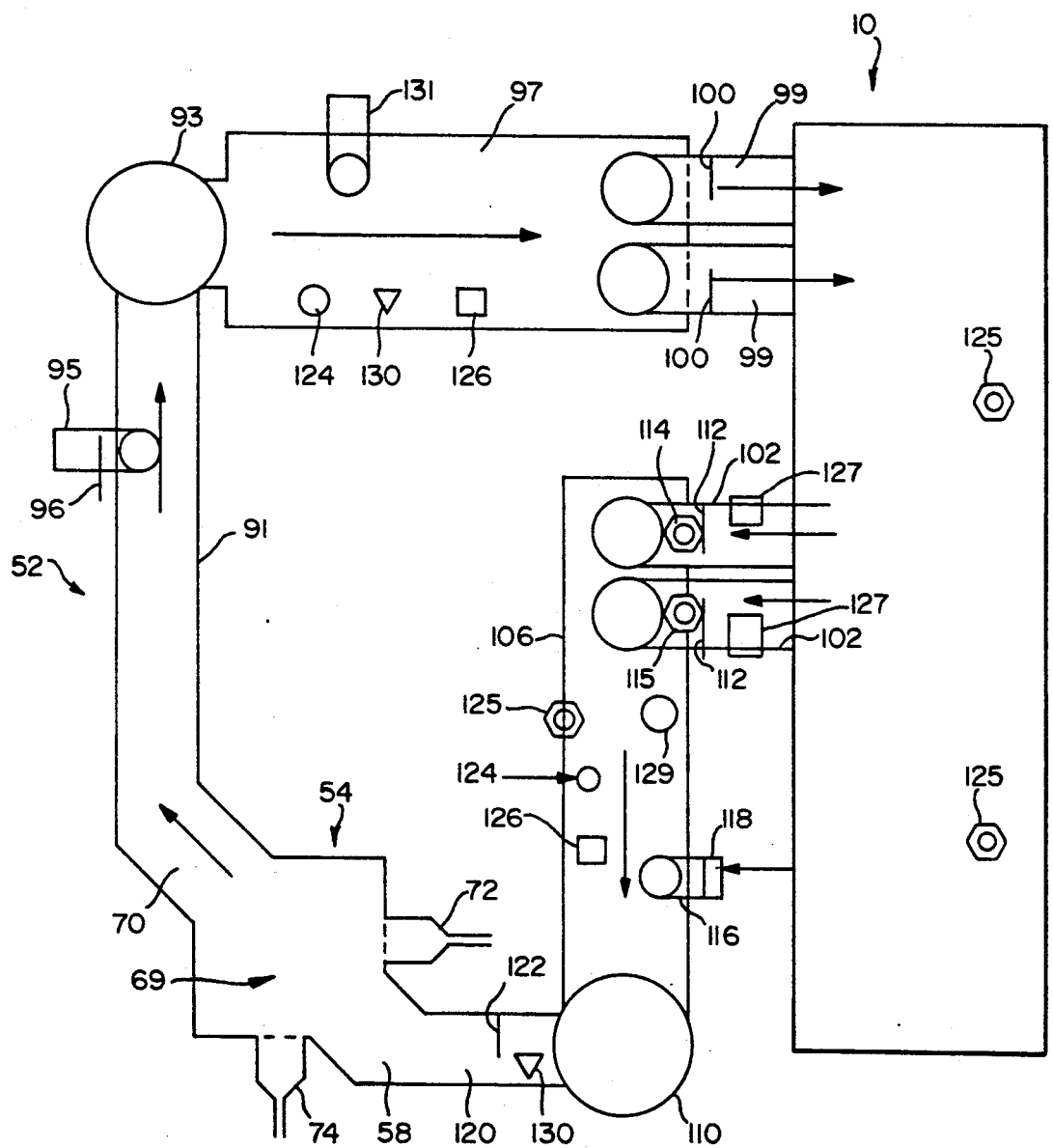
FIG. 1 is a schematic view of the overall contaminant-removal system of the present invention.
Figure 2:
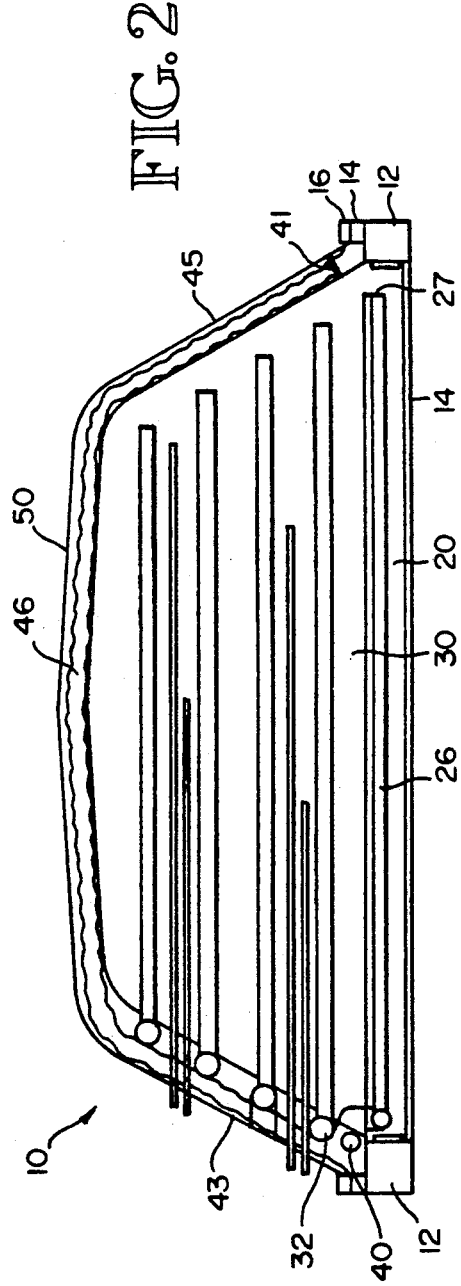
FIG. 2 is a lateral cross-sectional view of the soil stack used in the system of the present invention.
Figure 3:
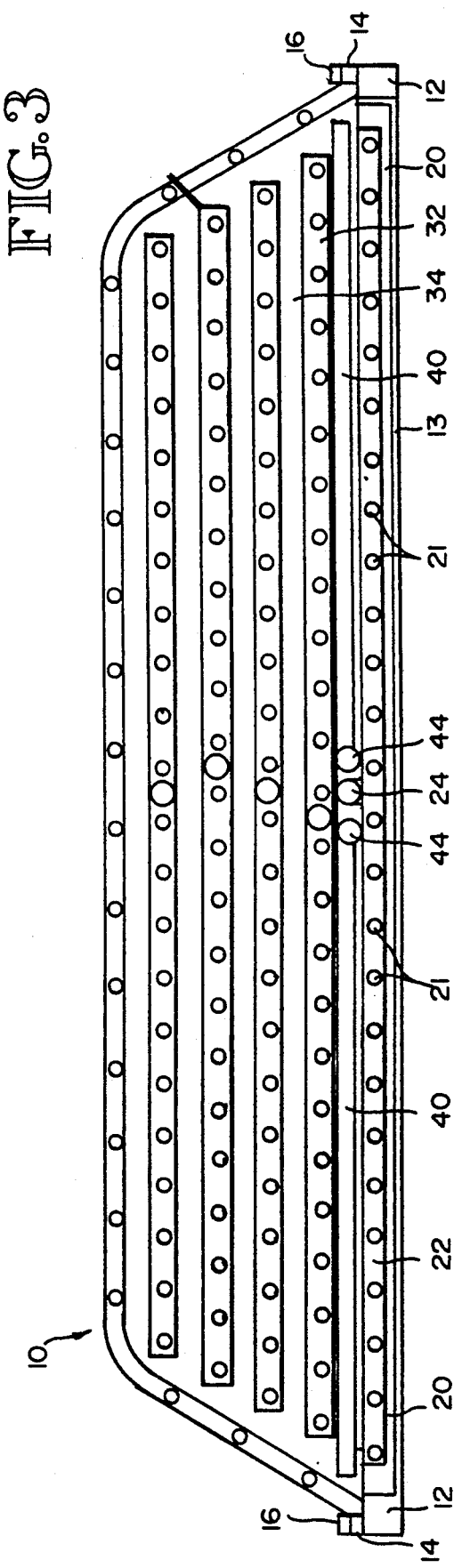
FIG. 3 is a longitudinal cross-sectional view of the soil stack used in the system of the present invention.

FIGS. 2 and 3 show the details of the soil stack portion of the present invention, while FIG. 1 shows the relative arrangement of the soil stack and the contaminant treatment apparatus portion of the present invention. In the construction of a soil stack, shown generally at 10, bales of straw or similar material are laid end-to-end, forming the outline of the base of the soil stack. The line of straw bales is shown generally at 12 in the form of a berm in FIGS. 2 and 3. The soil stack is typically but not necessarily rectangular in configuration, and for purposes of illustration could be approximately 54 feet long by 30 feet wide. One end of the soil stack is initially left open, i.e. temporarily without straw bales, to provide access for earthmoving equipment to form the soil stack. Following completion of the soil stack, the berm for that portion is completed so that the berm 12 extends around the entire perimeter of the soil stack. After the initial open-ended berm has been formed, a first support ridge 14 of a single layer of 2×6 wood boards is positioned on the top surface of the straw berm 12, around the entire length thereof.

A lower sealing member 13, such as six mill visqueen, is then placed over the area defined by the berm 12, forming the bottom layer of the soil stack 10. Typically, lower sealing member 13 extends up the interior sides of the berm and over the top of the first support ridge 14. A second support ridge 16, also comprising, in the embodiment shown, a layer of 2×6 wood boards, clamps the lower sealing member (as well as an upper sealing member as explained below) in place, producing a sealing effect around the base of the soil stack 10. At this point, actual placement of contaminated soil in the soil stack begins.

A first layer 20 of contaminated soil is then placed over lower sealing member 13 to a thickness of approximately 8–10 inches. Typically, the upper surface of the first layer 20 is smoothed out, without packing down the soil, which would decrease the efficiency of the system. A first 12-inch diameter hot air distribution header pipe 22 is positioned along the length of one longitudinal side of the stack along the inside surface of berm 12. Hot air distribution header pipe 22 is a conventional, commercially available pipe made of 24 gauge galvanized sheet metal. While pipe 22 in the embodiment shown is 12 inches in diameter, it should be understood that other sizes can be used. Hot air distribution header pipe 22 has a plurality of interior connections 21–21 along the length thereof, and one exterior connection 24.

Connected to the interior connections 21–21 and extending therefrom substantially all the way laterally across the soil stack 10 are a plurality of hot air dispensing pipes 26–26. Hot air dispensing pipes 26 are perforated along the length thereof, are approximately 4 inches in diameter, and are spaced at 2-foot intervals in the embodiment shown. It should be understood, however, that the spacing and diameter of pipes 26 can vary. The pipes 26 are all capped at the far ends 27 thereof. Hence, in operation, hot air coming in through exterior connection 24 moves through the distribution header pipe 22 and then out through dispensing pipes 26–26 into the soil, basically covering the area of the soil stack 10 for a given vertical distance.

A second layer of contaminated soil 30 is then placed on top of the hot air dispensing pipes 26. The second layer 30 is approximately 24 inches high, although this could be varied, such as within a range of 10–30 inches. A second network of a hot air distribution header pipe and a plurality of hot air dispensing pipes is then placed on top of the second layer of contaminated soil 30. Alternating layers of contaminated soil and hot air pipe networks are successively positioned until the soil stack 10 is finished. Typically, the height of a completed soil stack will be approximately 10 feet, although this can be varied. Generally, however, it is preferable to have the soil stack somewhat less than 10 feet, and spread over a broader area if necessary and space permits.

Two 12 inch diameter vapor-collection header pipes 40–40 are positioned end-to-end on top of the straw bale berm 12, close to and parallel with the hot air distribution header pipe 22. The vapor-collection header pipes 40–40, which are in registry, each include a plurality of upwardly pointing interior connections along the length thereof and one exterior connection 44 at one end thereof. The exterior connections 44 for the vapor-collection header pipes 40–40 are located at the interior ends of each pipe, and are hence closely adjacent to each other.

Extending over the soil stack 10, i.e. up the longitudinal side 43 of soil stack 10 from the vapor-collection header pipes 40–40, over the top of the soil stack 10 and then down the other side 45, are a plurality of vapor-extraction pipes 46–46. The vapor-extraction pipes 46–46 are typically made from a flexible material, are 4 inches in diameter and perforated along the lengths thereof in the embodiment shown and are located at 2-foot intervals along the length of the vapor-collection pipes 40–40, connecting with the interior connections of the vapor-collection header pipes 40–40. The vapor extraction pipes 46–46 typically extend down to the berm on the other side of the stack from the vapor collection pipes 40–40.

Positioned over the entire soil stack, including the vapor-extraction pipes 46–46, as well as the vapor-collection header pipes 40–40 and the hot air distribution header pipes, is an air-impermeable upper sealing member 50 which in the embodiment shown is also made of six mill thick visqueen material. Any seams in the visqueen member 50 are carefully and securely taped. Openings in the visqueen member 50 are provided for the exterior connections of the vapor-collection header pipe and the hot air distribution header pipe. Sealing member 50 is pulled tightly over the soil stack and anchored at the lower edges of the soil stack between the two support ridges 14 and 16, along with the peripheral edge of lower sealing member 13. This system is designed to prevent escape of any vapors/contaminants from the soil stack to the atmosphere.

Figure 4:
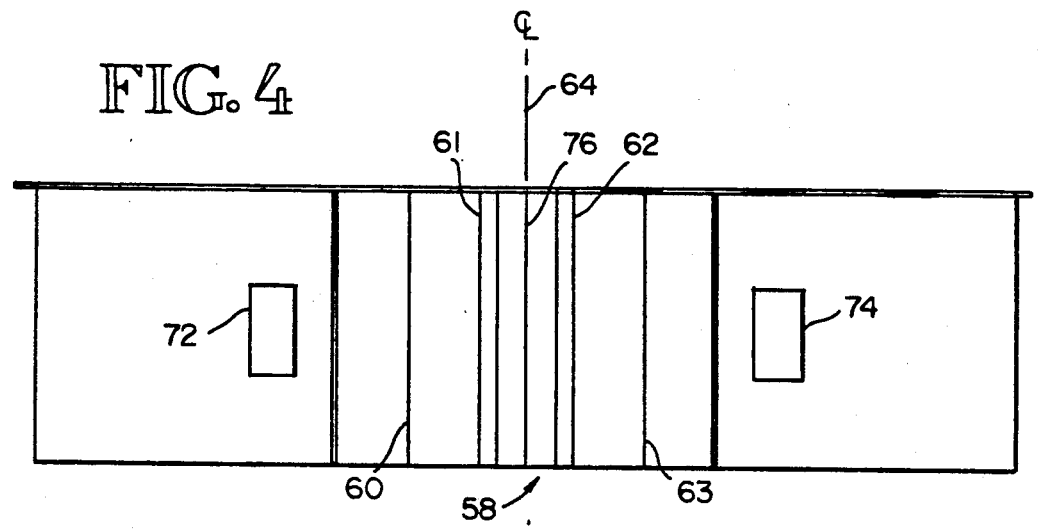
FIG. 4 is a side elevational view of the burner portion of the system of the present invention.
Figure 5:
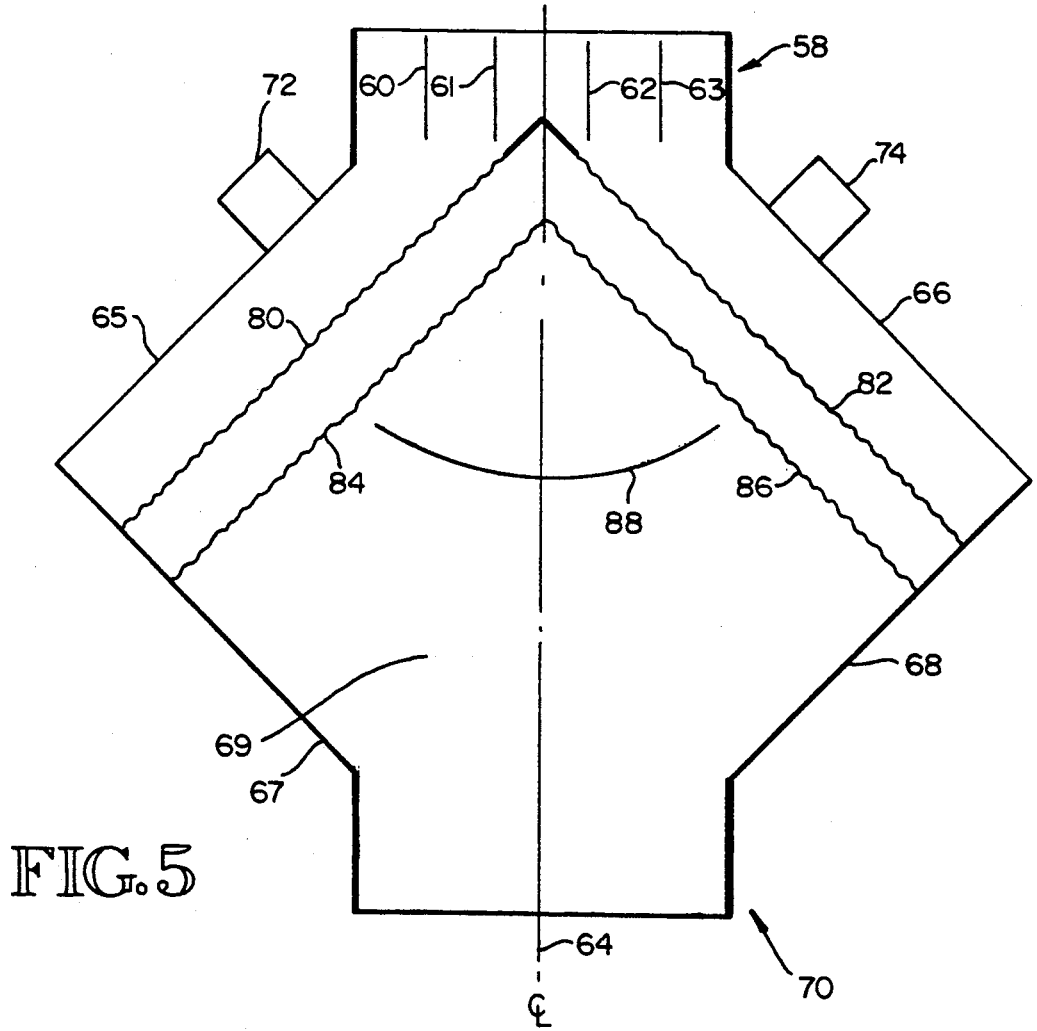
FIG. 5 is a top view of the burner portion of the system of the present invention.

At this point, the soil stack 10 is connected to the hot air vapor-extraction system, which is referred to generally in FIG. 1 at 52. A key portion of the vapor-extraction system shown generally at 52 is an incinerator or burn chamber shown generally at 54. The burn chamber 54 is shown in detail in FIGS. 4 and 5. It includes an inlet portion 58 which in the embodiment shown is 12 inches high by 16 inches wide and approximately 6 inches deep. Positioned in inlet 58 are a series of solid vertical vanes 60–63, spaced 2 inches and 5 inches away from center line 64, on both sides thereof. The centermost two vanes 61 and 62 are each 2 inches wide, while the outer two vanes 60 and 63 are 3 inches wide in the embodiment shown.

Flaring outwardly from the interior end of inlet 58 are two outside walls 65 and 66, which extend at an angle of approximately 135° relative to inlet 58 and are thus 90° apart from each other. Walls 65 and 66 are each approximately 12 inches high and 18 inches long. Connected to the far ends of outside walls 65 and 66 are outside walls 67 and 68, which extend inwardly toward each other at an angle of 90° relative to outside walls 65 and 66. Outside walls 67 and 68 terminate in an outlet portion 70 which is in registry with and the same approximate size as inlet 58, on the direct opposite side of the burn chamber from inlet 58.

The burn chamber 54 also includes top and bottom walls which extend over the entire area of the burn chamber, thereby with the above-described elements defining an enclosed chamber. All of the above-described elements comprising the burn chamber 54 are made in the embodiment shown from steel plates approximately ⅛ inch thick. Positioned in outside walls 65 and 66 near inlet 58 are two propane burners 72 and 74. Propane burners 72 and 74 provide the required heat for the burn chamber 54 as discussed hereinafter. Positioned within the burn chamber 54 at center line 64, approximately at the intersection of inlet 58 and the main interior region 69 of the burn chamber, is an angle iron section 76 which extends from top to bottom of the burn chamber and is approximately 2 inches on each side with the angle iron section 76 flaring outwardly into the main interior region 69 of the chamber.

Extending from the free ends of the angle iron section 76, parallel with outside walls 65 and 66, respectively, to outside walls 67 and 68 are expanded metal members 80 and 82. The expanded metal members have slots therein such that they are about 50% open. Two additional expanded metal walls 84 and 86 are positioned parallel with walls 80 and 82, approximately 3 inches therefrom. Farther into the main interior region 69 of the burn chamber is a curved baffle element 88 which extends from a point approximately midlength of, and one inch away from, expanded metal wall 84, curves slightly toward outlet portion 70 and then back toward expanded metal wall 86, terminating approximately one inch away therefrom.

In operation, this arrangement results in air and contaminated vapors which come into inlet portion 58 dispersing around the angle iron section 76, moving through a flame region produced by the propane burners, and then around to the front of the baffle 88 and out outlet portion 70. This arrangement insures the circulation of air through the burn chamber to achieve maximum destruction of the contaminants.

Referring to FIG. 1, from outlet portion 70, a first air duct section 91, having the same cross-sectional outline as outlet portion 70, extends to a first blower 93. Located shortly before first blower 93 is a fresh-air intake vent 95 with a damper element 96 therein. A second air duct section 97 extends from blower 93 to soil stack 10. An exhaust member 131 is positioned in air duct section 97 just downstream of blower 93. A plurality of connecting ducts 99, each having damper elements 100 therein, connect air duct section 97 with the individual hot air distribution headers in the soil stack. For purposes of illustration, two connecting ducts 99 are shown. However, it should be understood that "T" connections and/or additional connecting ducts are used in an actual system, depending upon the number of hot air distribution headers used in the soil stack. The damper elements 100 provide control over the movement of heated air into the soil stack 10.

Extending from the vapor collection header pipes (the exterior connections thereof) in the soil stack to a third air duct section 106 are connection ducts 102-102. Located in the connection ducts 102-102 are damper elements 112, which control the flow of vapors out of the soil stack 10. Test ports 114-115 are located in connection ducts 102-102 for convenient testing of the vapors extracted from the soil stack. Air duct section 106 extends to a second blower 110. Positioned in the air duct 106, in the vicinity of blower 110, is a fresh-air intake vent 116 having a damper element 118 therein. Extending from blower 110 to burn chamber inlet portion 58, completing the closed vapor-extraction system, is a fourth air duct section 120. A damper element 122 is positioned in air duct section 120, slightly downstream of blower 110.

Several other system test instruments are positioned at various points in the vapor-extraction system. In the embodiment shown air-flow meters 124-124 and temperature gauges 126-126 are positioned in air duct section 97 and 106 while static pressure gauges 130-130 are positioned in air duct sections 97 and 120, just downstream of blowers 93 and 110. Additional test ports 125-125 are provided in the soil stack 10 and duct section 106 to test the vapors from the soil stack. Lastly, additional air flow meters 127 are positioned in connection ducts 102-102, and a LEL (lower explosive level) monitoring port 129 is positioned in air duct section 106.

In operation, after system start-up has been completed, during which the blowers are run for a period of 10 minutes or so prior to turn-on of burners 72 and 74 and following assurance that the vapor stream is not at an explosive level (obtained through monitoring port 129) the burners are ignited, heating the air in the burn chamber to approximately 275°–300° F. With both of the blowers 93 and 110 on, damper elements 100-100 and 122 are adjusted to insure efficient burner performance. The temperature of the hot air stream is continuously monitored in air duct section 97 by temperature gauge 124. The heated air proceeds in through connection ducts 99-99 to the various hot air distribution headers and from there into the perforated hot air dispensing pipes and the contaminated soil.

The movement of the hot air through the soil volatilizes the contaminants, with the vapor moving up through the soil stack 10 to top thereof, where the vapors are collected by the various vapor extraction pipes and then move to the vapor-collection headers. The collected vapors then move through the connecting ducts 102-102 into air duct section 106. The contaminant level of the vapor stream is continuously monitored by conventional monitoring equipment through test ports 114-115 in air duct section 106, as well as through test ports 125-125 in the soil stack. Typically, a data collection system and computer station is included which receives the information from the test ports, controls the dampers and provides displays and/or reports on the operation of the system and the contaminant level. Appropriate alarms can be provided should specified conditions be reached.

The vapor flow from the soil stack is drawn by blower 110 and then directed into burn chamber 54, where the contaminants are destroyed to an acceptable level. Fresh air is taken into the system through fresh air intake vents 95 and 116, controlled by the dampers therein. A pressure balancing exhaust element 131 is provided in air duct section 97 and operates when needed, relative to the amount of fresh air taken into the system. Hence, the overall system is substantially closed. The contaminants released from the soil stack are continuously recirculated to the burn chamber. A small amount of contaminants may be released to the atmosphere through the pressure balancing exhaust element 131. This small amount of contaminants may be directed to a catalytic reactor or similar system for destruction, if necessary.

When the contaminant level from the soil stack has been reduced to a desired level, soil samples are typically taken from the stack and sent out for analysis to verify the completion of the remediation process in accordance with state and/or local law. A full report is then typically produced based on the data collected during operation of the system.

At this point, the operation of the vapor-extraction system is terminated, and the system is disconnected from the soil stack. The soil stack is then dismantled by first removing the upper sealing member, then the vapor pipes, and then gradually and carefully removing the soil and hot air pipes, beginning at one end of the stack. The remediated soil is then returned to its original location, or otherwise disposed of if so required, while the hot air and vapor-extraction pipes are prepared for further use.

The process is typically completed at a given site within 7 to 14 days, which is significantly faster than existing on-site systems, and is typically considerably less expensive. Also, being an on-site remediation system, the soil is typically constructively reused instead of having to be disposed of in some manner.

Although a preferred embodiment of the invention has been disclosed herein for illustration, it should be understood that various changes, modifications and substitutions may be incorporated in such embodiment without departing from the spirit of the invention as defined by the claims which follow.

We claim:

1. A system for remediation of contaminated soil removed from a soil site, comprising:
   a soil stack in the vicinity of the soil site, formed of alternating layers, from a lower surface to a top surface of the soil stack, of contaminated soil which has been removed from the soil site and hot air dispensing pipes, with a plurality of vapor extraction pipes overlaying at least a portion of the soil stack, the soil stack and the vapor extraction pipes being covered by a sealing member to prevent escape of contaminated vapors from the soil stack to the atmosphere; and
   a recirculating system for heating air and destroying contaminants in contaminated vapors which have been released from the soil stack and which move into the vapor extraction pipes, the recirculating system including a burn chamber, a heated air outlet and a vapor inlet, wherein the system includes first means connecting the heated air outlet to said hot air dispensing pipes, second means connecting the vapor extraction pipes to the vapor inlet and means moving heated air from the burn chamber into the first connecting means and from there into the soil stack and means moving contaminate-containing vapors into the second connecting means and from there into the burn chamber.

2. A system of claim 1, wherein the soil stack has a base region and includes a berm boundary around the base region of the soil stack and a lower sealing member forming the bottom of the soil stack, extending to and substantially over said berm member, wherein the hot air dispensing pipes include a plurality of hot air distribution header pipes located along one side of the soil stack, each distribution header pipe having a plurality of perforated hot air dispensing pipes extending therefrom to substantially the other side of the soil stack, and wherein the vapor extraction pipes include at least one vapor-collection header pipe, and a plurality of flexible, perforated vapor extraction pipes extending over the soil stack and connected to the vapor-collection header pipe.

3. A system of claim 1, wherein the recirculating system is substantially closed, with only a small amount of contaminants being released to the atmosphere during operation of the system.

4. A system of claim 2, wherein the hot air distribution header pipes and the vapor-collection header pipe are approximately 12 inches in diameter, and wherein the hot air dispensing pipes and the vapor extraction pipes are approximately 4 inches in diameter.

5. A system of claim 1, including damper elements positioned in the first and second connecting means for control of the movement of hot air into the soil stack and contaminant-containing vapors from the soil stack.

6. A system of claim 1, including test ports positioned in the second connecting means for monitoring the amount of contaminants in vapors passing therethrough.

7. A system of claim 1, wherein the burn chamber includes at least one burner assembly associated therewith, the burn chamber including an inlet and an outlet, and wherein the system further includes a first air duct connecting the outlet of the burn chamber to a first blower, a second air duct connecting the first blower to the first connecting means, a third air duct connecting the second connecting means to a second blower, and a fourth air duct connecting the second blower to the inlet of the burn chamber.

8. A system of claim 7, including fresh air intake vents positioned in the first and third air ducts.

9. A system of claim 7, including a temperature gauge and an airflow meter positioned in both the second and third air ducts.

10. A system of claim 1, including means for accumulating and displaying data concerning operation of the system.

11. A system of claim 1, wherein the temperature of the heated air supplied to the soil stack is within the range of 275°–300° F.

12. A system of claim 1, including test ports positioned in the soil stack and test means positioned in said test ports for monitoring the amount of contaminants in vapors in the soil stack.

13. A system of claim 1, including a movable trailer means on which the recirculating system can be mounted and moved from site to site.

14. A system of claim 1, including a catalytic converter for destroying the small amount of contaminants.

15. A system of claim 7, wherein the outlet is positioned directly across from the inlet in the burn chamber and wherein the burn chamber further includes at least one expanded metal member and a curved baffle member positioned successively between the inlet and the outlet, wherein the expanded metal member has slots therein such that the member is approximately 50% open, the expanded metal member angling outwardly and toward the outlet, in the direction of two opposing sides of the burn chamber, from a point which is midway laterally of the inlet, the baffle element being slightly concave in the direction of the inlet.

16. A method for remediation of contaminated soil removed from a soil site, comprising:
   forming a soil stack in the vicinity of the soil site, the soil stack comprising successively alternating layers, from a lower surface to a top surface thereof, of contaminated soil which has been removed from the soil site and hot air dispensing pipes, the soil stack being overlaid with a plurality of vapor extraction pipes, and then covered by a sealing member so as to prevent escape of contaminant-containing vapors from the soil stack into the atmosphere;

heating air and directing it into the soil stack through the hot air dispensing pipes, resulting in the release of contaminant-containing vapors from the contaminated soil;

collecting the contaminant-containing vapors in the vapor extraction pipes and drawing them out of the soil stack; and destroying the contaminants in the collected vapors to a selected level, wherein the method is characterized by a substantial lack of discharge of contaminants to the atmosphere.

17. A method of claim 16, wherein the step of heating the air and the step of destroying the contaminants are accomplished in a single burn chamber.

18. A method of claim 16, including the step of periodically testing the contaminant level of the vapor collected from the soil stack.

19. A method of claim 16, including the step of monitoring the results of the method and displaying said results.

20. A method of claim 16, wherein the temperature of the heated air is within the range of 275°–300° F.

21. A method of claim 16, wherein the method includes the step of passing the collected vapors through a catalytic converter following the step of destroying.

22. A method of claim 21, including the step of periodically monitoring any vapors emitted from the catalytic converter.

* * * * *

UNITED STATES PATENT AND TRADEMARK OFFICE
CERTIFICATE OF CORRECTION

PATENT NO. : 5,213,445
DATED : May 25, 1993
INVENTOR(S) : Maynard D. Ikenberry; Dwight S. Ikenberry It is certified that error appears in the above-identified patent and that said Letters Patent is hereby corrected as shown below:

Column 8, line 49, change "1" to --3--

Signed and Sealed this

Twelfth Day of April, 1994

Attest:

BRUCE LEHMAN

Attesting Officer

Commissioner of Patents and Trademarks